United States Patent [19]
Cohn

[11] Patent Number: 6,039,528
[45] Date of Patent: Mar. 21, 2000

[54] WHEELCHAIR LIFT WITH IMPROVED OUTER, INNER, AND SIDE BARRIERS

[75] Inventor: Alan Cohn, Lockeford, Calif.

[73] Assignee: Lift-U, Division of Hogan Manufacturing, Inc., Escalon, Calif.

[21] Appl. No.: 08/777,583

[22] Filed: Dec. 31, 1996

[51] Int. Cl.$^7$ ........................................... B60P 1/44
[52] U.S. Cl. .......................................... 414/546; 414/921
[58] Field of Search ..................... 414/540, 541, 414/545, 546, 921

[56] References Cited

U.S. PATENT DOCUMENTS

| | | |
|---|---|---|
| Re. 31,178 | 3/1983 | Deacon . |
| Re. 33,595 | 5/1991 | Sullivan et al. . |
| 3,737,009 | 6/1973 | Stoddard . |
| 3,888,463 | 6/1975 | O'Brien et al. . |
| 4,083,429 | 4/1978 | Abbott . |
| 4,124,130 | 11/1978 | Rohrs et al. . |
| 4,180,366 | 12/1979 | Roth et al. . |
| 4,214,849 | 7/1980 | Downing . |
| 4,251,179 | 2/1981 | Thorley . |
| 4,273,217 | 6/1981 | Kajita . |
| 4,442,921 | 4/1984 | Sherman . |
| 4,457,402 | 7/1984 | Del Vecchio et al. . |
| 4,479,753 | 10/1984 | Thorley . |
| 4,480,719 | 11/1984 | Risner . |
| 4,556,128 | 12/1985 | Thorley et al. . |
| 4,606,433 | 8/1986 | Smalley et al. . |
| 4,627,784 | 12/1886 | Collins ..................................... 414/540 |
| 4,664,584 | 5/1987 | Braun et al. . |
| 4,718,812 | 1/1988 | Smalley et al. . |
| 5,026,244 | 6/1991 | Dorn . |
| 5,040,936 | 8/1991 | Rhea ..................................... 414/540 |
| 5,149,246 | 9/1992 | Dorn . |
| 5,152,521 | 10/1991 | Wendt et al. ........................... 414/921 |
| 5,228,538 | 7/1993 | Tremblay . |
| 5,261,779 | 11/1993 | Goodrich . |
| 5,299,904 | 4/1994 | Simon et al. . |
| 5,316,432 | 3/1994 | Smalley et al. . |
| 5,373,915 | 12/1994 | Tremblay . |
| 5,382,130 | 1/1995 | Kempf . |
| 5,393,192 | 2/1995 | Hall et al. ............................... 414/921 |
| 5,401,135 | 3/1995 | Stoen et al. . |
| 5,433,580 | 7/1995 | Kempf . |
| 5,439,342 | 8/1995 | Hall et al. . |
| 5,445,488 | 8/1995 | Saucier et al. . |
| 5,556,250 | 9/1996 | Fretwell et al. ........................ 414/921 |

FOREIGN PATENT DOCUMENTS

| | | |
|---|---|---|
| 1 137 929 | 12/1982 | Canada . |
| 27 59 017 | 12/1977 | Germany . |
| 2 055 344 | 3/1981 | United Kingdom . |
| WO 80/02538 | 11/1980 | WIPO . |
| WO 90/05072 | 5/1990 | WIPO . |
| WO 92/20313 | 11/1992 | WIPO . |
| WO 94/27546 | 12/1994 | WIPO . |

*Primary Examiner*—Thomas J. Brahan
*Attorney, Agent, or Firm*—Christensen O'Connor Johnson & Kindness PLLC

[57] ABSTRACT

A platform-type wheelchair lift for mounting in the stairwell of a vehicle, such as a bus or train. The wheelchair lift includes a platform frame that is movable from a retracted position in which it is stowed underneath the vehicle to an extended position in which it extends out from the side or back of the vehicle. A wheelchair platform is movably coupled to the platform frame by a parallelogram linkage that allows the wheelchair platform to move between a lowered and a raised position. The wheelchair platform includes foldable outer, side, and inner wheelchair barriers that prevent a wheelchair from moving off of the wheelchair platform during operation of the wheelchair lift. The outer and inner wheelchair barriers are capable of absorbing part of the energy of an impact between a wheelchair and the barriers and in ways cause barriers to fold out.

10 Claims, 10 Drawing Sheets

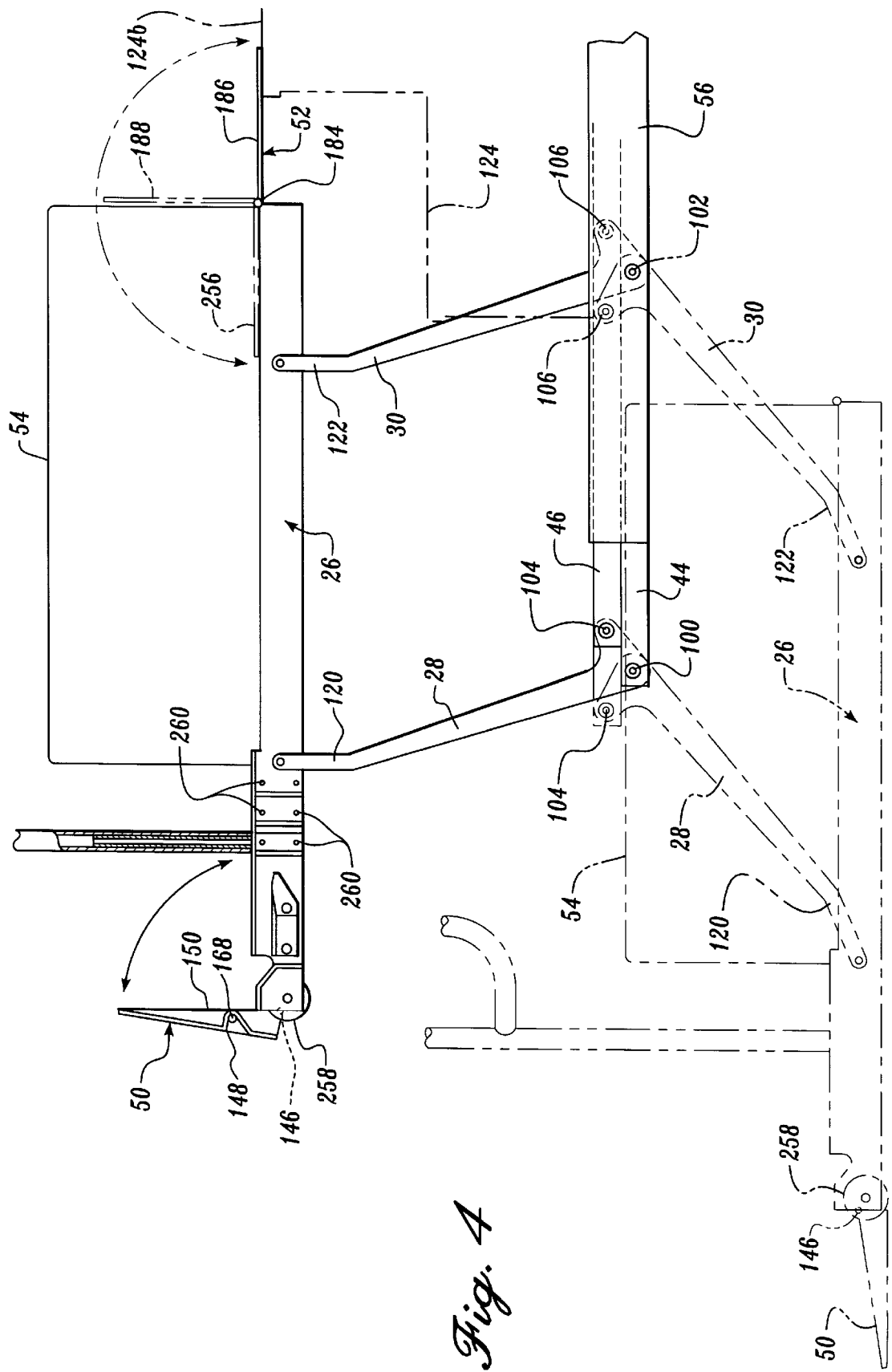

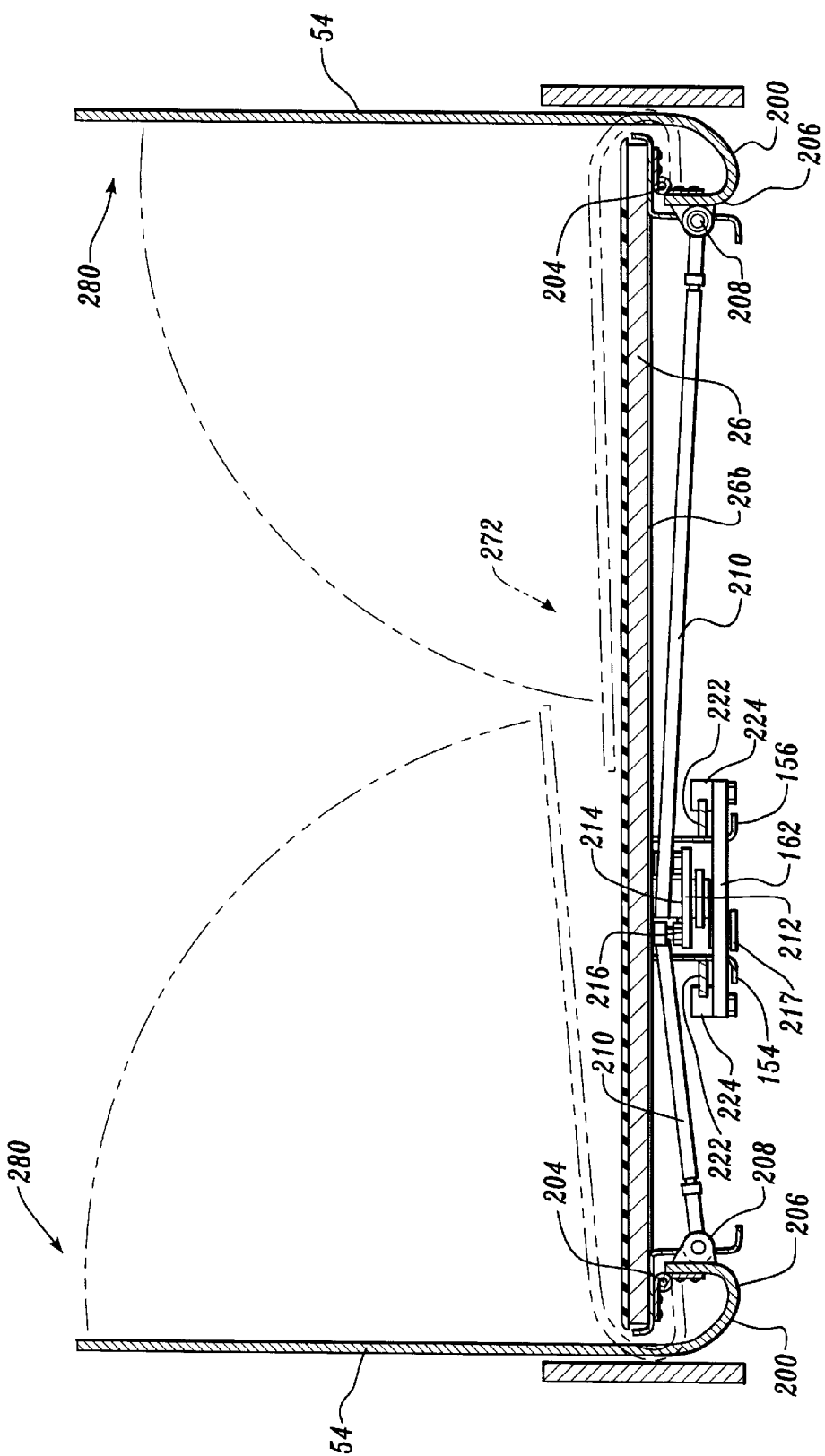

WHEELCHAIR LIFT WITH IMPROVED OUTER, INNER, AND SIDE BARRIERS

FIELD OF THE INVENTION

The present invention relates to wheelchair lifts, and more particularly, to platform type wheelchair lifts that include platforms that extend out from the side or back of a vehicle and move between a lowered position and a raised position.

BACKGROUND OF THE INVENTION

Wheelchair lifts of the type installed in the stairwells of transit vehicles, such as city buses, are well-known. One type of wheelchair lift commonly referred to as a "step lift," is illustrated in U.S. Pat. No. 4,466,771 to Thorley et al. (the '771 patent). Another type of wheelchair lift, commonly referred to as a "platform lift, " is illustrated in U.S. Pat. No. 4,058,228 to Hall (the '228 patent).

Both wheelchair step lifts and platform lifts typically include a wheelchair platform that is movable from a lowered position in which the wheelchair platform lies adjacent the sidewalk or ground to a raised position in which the wheelchair platform lies in the same plane as the aisle way of the bus, train, or other vehicle on which the lift is mounted. A wheelchair is loaded onto the wheelchair platform when it is in the lowered or raised position at which time the platform is moved to the opposite position in order to allow the wheelchair to be moved into or out of the bus or other vehicle on which the wheelchair lift is mounted. In order to decrease storage space and improve usability, a number of platform-type wheelchair lifts such as that described in the '228 patent include wheelchair platforms that retract under the bottom of the bus or other vehicle on which the lift is mounted. In some wheelchair lifts such as that disclosed in the '228 patent the wheelchair platform forms the lower step of the vehicle entryway.

A number of wheelchair lifts incorporate outer and sometimes inner (with respect to the vehicle) foldable barriers that help to maintain a wheelchair on the wheelchair platform. In addition, some wheelchair lifts include fixed side barriers to help maintain the wheelchair on the wheelchair platform. It would be beneficial if improved outer, side and inner barriers could be developed to ensure that a wheelchair cannot move off the wheelchair platform during operation of the wheelchair lift. It would also be beneficial to improve current wheelchair barriers to improve their capability to absorb energy from an impact between a wheelchair and the barriers, to help reduce the possibility of injury to the wheelchair occupant, as well as reduce the high loads applied to the mechanisms as a result of impact. It would also be beneficial to provide both electrical and mechanical mechanisms that prevent the barriers and lift from operating improperly.

The present invention is a wheelchair lift that overcomes some of the disadvantages of prior art wheelchair lifts.

SUMMARY OF THE INVENTION

The present invention is a wheelchair lift that includes foldable outer, inner and side wheelchair barriers that help to prevent a wheelchair from moving off of the wheelchair platform. The outer and inner wheelchair barriers may be capable of absorbing some of the energy of a collision between a wheelchair and the outer and inner barriers.

In one embodiment, the wheelchair lift includes a platform frame that is movable between an extended position and a retracted position. The wheelchair platform is coupled to the platform frame and is movable between a raised position and a lowered position. Opposing foldable side barriers are attached to opposite sides of the wheelchair platform and are movable between a raised position and a retracted position. In the raised position, the side barriers extend approximately perpendicular to an upper surface of the wheelchair platform and in the retracted position the side barriers lie adjacent to the upper surface of the wheelchair platform.

In accordance with other aspects of the invention, the bottom ends of the side barriers are curved through approximately 180 degrees to allow them to be attached to the underside of the wheelchair platform. The wheelchair lift also includes a bell crank that is rotatably attached to the bottom of the wheelchair platform. The side barriers are attached to opposing ends of the bell crank such that the rotation of the bell crank moves the side barriers between raised and retracted positions. A hydraulic cylinder is connected to the wheelchair platform and actuates the side barriers.

In accordance with other features of the invention, the wheelchair lift includes a plate having a Z-shaped slot that is attached to the bell crank and the actuator. Actuation of the plate causes the bell crank to move within the Z-shaped slot thus causing the bell crank to rotate and move the side barriers between the raised and lowered positions.

In accordance with other aspects of the invention, the wheelchair lift includes sensitive barriers that are mounted on opposing sides of the wheelchair platform. The sensitive barriers extend upward from an upper surface of the wheelchair platform such that contact between the sensitive barriers and an article on top of the wheelchair platform produces a control -signal indicative of the presence of an article contacting the sensitive barriers. The control system controls the movement of the wheelchair lift in response to the control signals produced by the sensitive barriers so that when an article contacts the sensitive barriers the control system stops the movement of the wheelchair platform. These sensitive barriers are rotatably coupled to the sides of the wheelchair platform such that rotation of the sensitive barriers produces the control signal.

In accordance with yet other aspects of the invention, the wheelchair lift includes at least one wheelchair barrier capable of absorbing and dissipating some energy of a collision between a wheelchair located on the wheelchair platform and the wheelchair barrier. Some of the energy is dissipated through the use of a hydraulic relief valve.

In accordance with still other aspects of the invention, the wheelchair lift includes one or more sensors for controlling the position of the wheelchair barrier and providing positional information regarding at least three positional states of the wheelchair barrier. The sensors provide information regarding when the wheelchair barrier is in the fully extended position, the fully retracted position, and an intermediate position in which the wheelchair barrier extends approximately upward perpendicular to the upper surface of the wheelchair platform. The control system uses the positional information provided by the sensors in order to prevent the wheelchair barrier from moving from the fully extended position beyond the intermediate position in the case of a sensor failure. In one embodiment, a first sensor and a second sensor are used. If either the first or second sensors fails, the control system uses the information from the first and second sensors to prevent the wheelchair barrier from moving from the fully extended position beyond the intermediate position.

The wheelchair lift of the invention helps to reduce or eliminate a number of the problems associated with prior art wheelchair lifts. The invention's use of an inner barrier to form a bridge between the wheelchair platform and the steps of a vehicle on which the lift is mounted allows the invention to be used on different vehicles with only minor changes. The same wheelchair lift may be used on different vehicles by adjusting the height to which the wheelchair platform raises and the length of the inner barrier.

The foldable outer, inner, and side barriers prevent a wheelchair from moving off the wheelchair platform. In addition, a sensitive barrier located on the side of the wheelchair platform provides an indication of whether or not a wheelchair or passenger is moving into an improper position (exposure to pinch points, approaching the edge of the platform, etc.). A sensitive mat located on the upper surface of the wheelchair platform or other sensor such as an ultrasonic or infrared sensor also provides an indication of whether or not a wheelchair or person is located on the wheelchair platform.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 4 is a side elevational view of the wheelchair lift of FIG. 2 illustrating the wheelchair platform in a lowered and a raised position;

FIG. 6 is a cross-sectional view of the wheelchair platform of the wheelchair lift of FIG. 2 illustrating the foldable side wheelchair barriers and drive mechanism;

DETAILED DESCRIPTION OF THE PREFERRED EMBODIMENT

Figure 1:
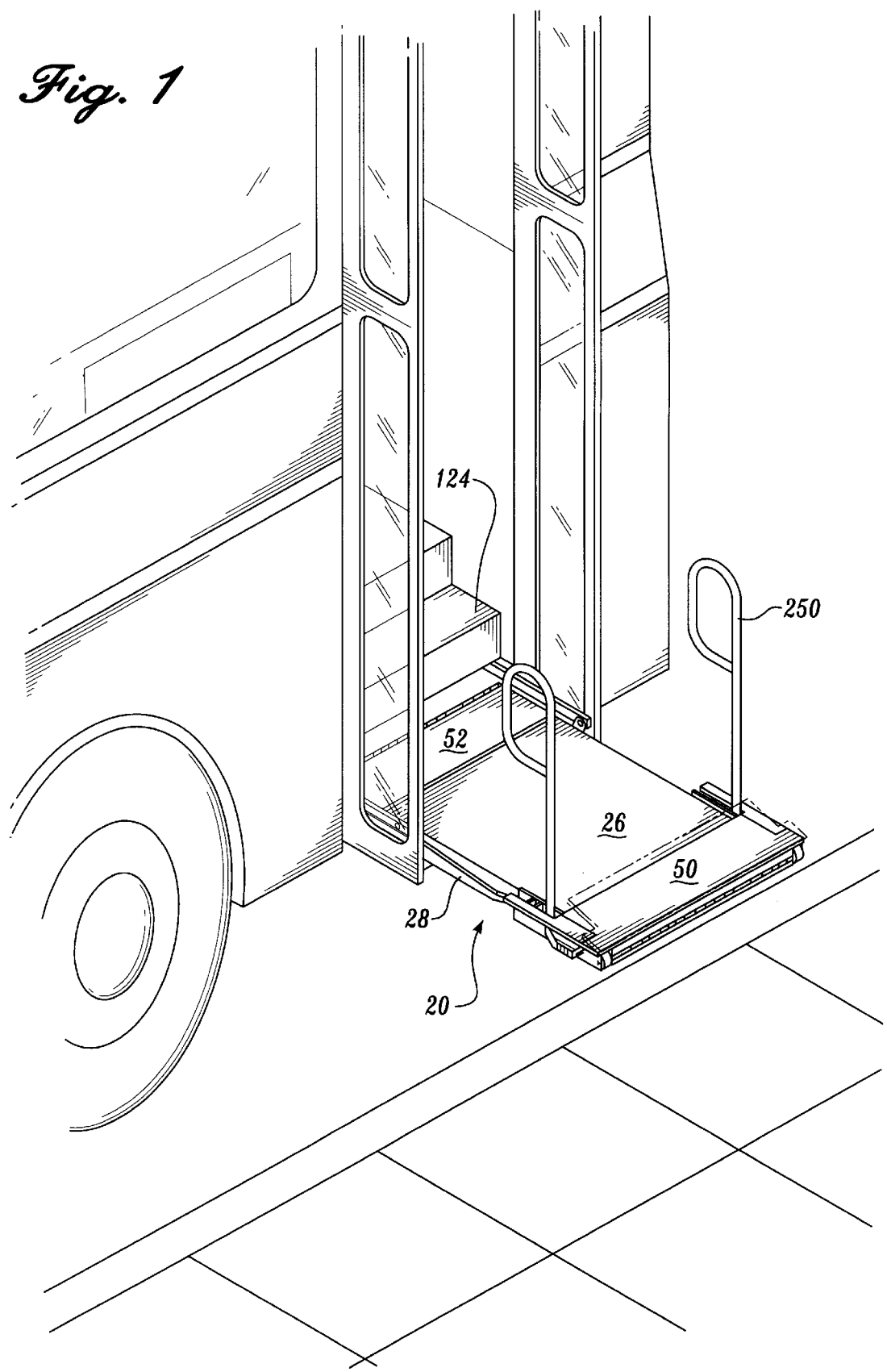
FIG. 1 is a perspective view of a wheelchair lift according to the present invention mounted within the entryway of a bus.
Figure 2:
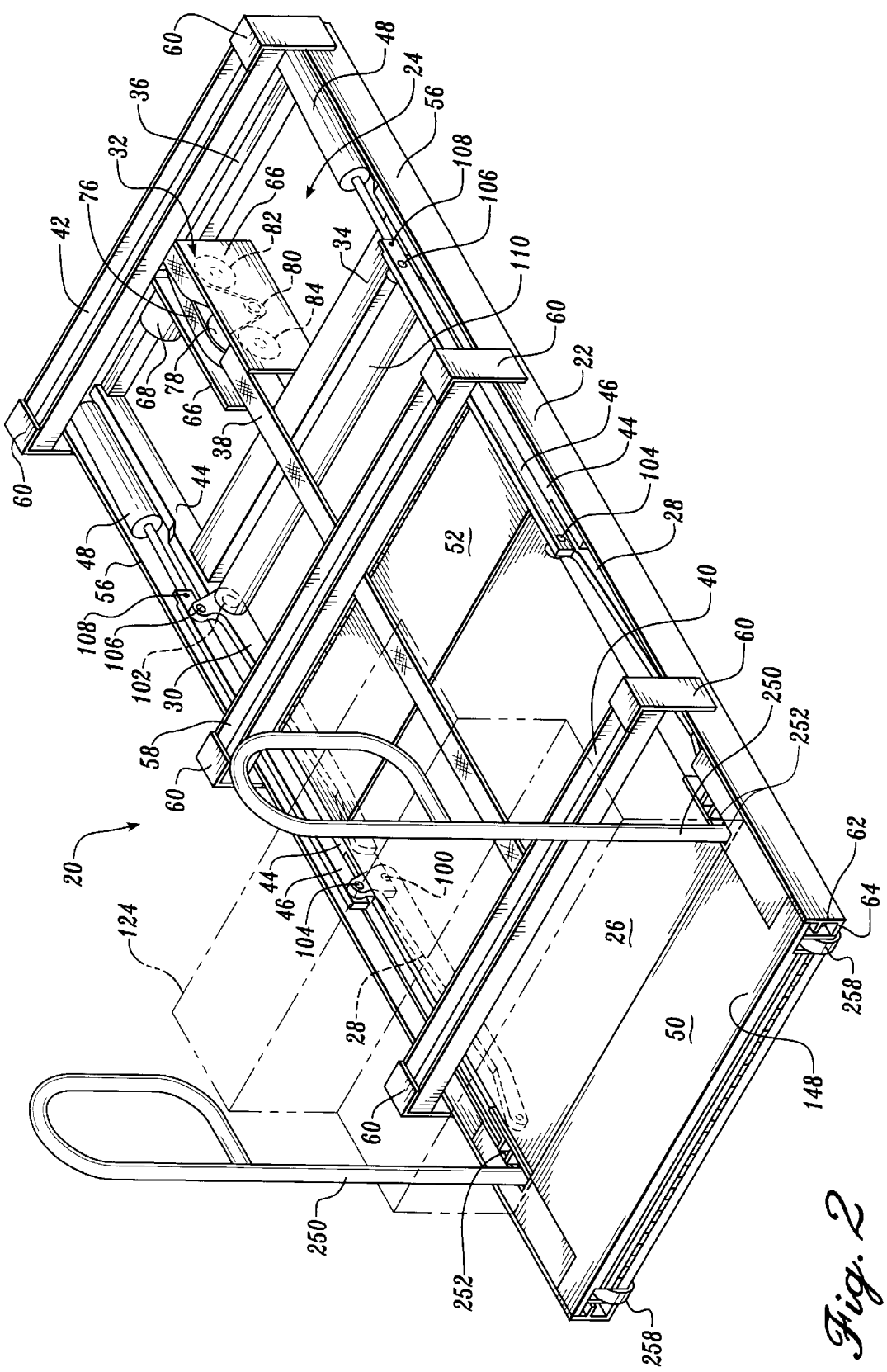
FIG. 2 is a perspective view of a wheelchair lift of the present invention showing the wheelchair platform retracted within the frame of the wheelchair lift.
Figure 3:
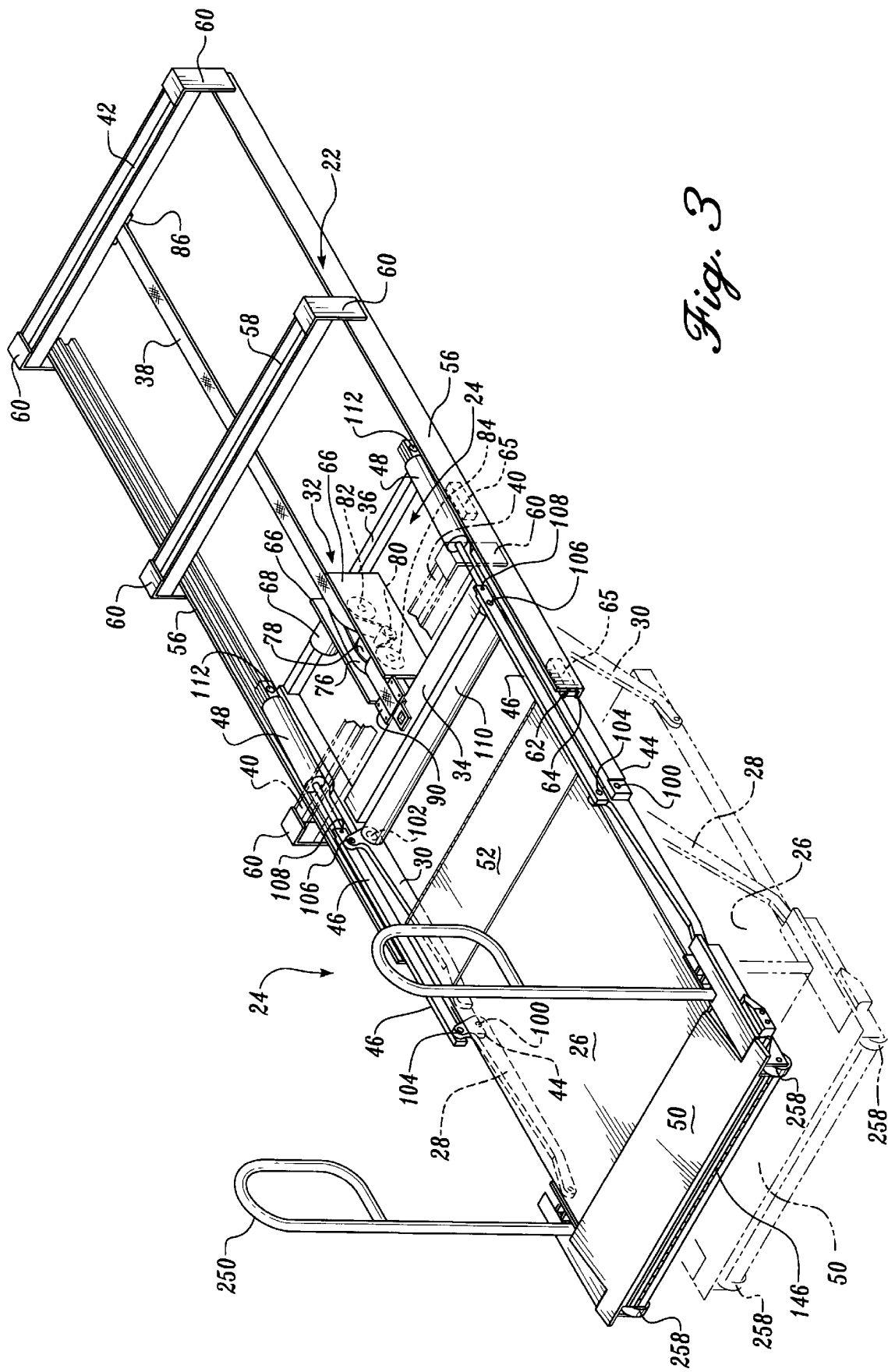
FIG. 3 is a perspective view of the wheelchair lift of FIG. 2 showing the wheelchair platform in an extended and a lowered position.

A platform-type wheelchair lift generally designated 20 constructed according to the present invention is illustrated in FIGS. 1–3. The wheelchair lift 20 includes a generally rectangular stationary frame 22 that is mounted to the underside of a vehicle such as a bus or train. A wheelchair platform frame generally designated 24 is slidably mounted within the stationary frame 22 so that the platform frame 24 may move between a first or retracted position (FIG. 2) in which the platform frame is retracted underneath the floor of the vehicle to a second or extended position (FIG. 3) in which the platform frame 24 extends outward from the vehicle on which the wheelchair lift is mounted. A wheelchair platform 26 is mounted within the platform frame 24 through the use of outer platform arms 28 and inner platform arms 30 so that the wheelchair platform may be moved from a lowered position as best seen in phantom in FIGS. 3 and 4 to a raised position as shown in FIG. 4.

When the platform frame 24 is fully extended and the wheelchair platform 26 is in the lowered position (shown in phantom in FIGS. 3 and 4), a wheelchair occupant may maneuver a wheelchair onto or off of the wheelchair platform 26. The wheelchair platform 26 is then moved to its raised position (FIG. 4), at which time the wheelchair occupant may maneuver the wheelchair into or out of the interior of the bus or other vehicle, as described in more detail below.

The platform frame 24 is moved between the extended and retracted positions by a belt drive mechanism designated 32. The belt drive mechanism 32 is attached to the platform frame 24 between outer and inner cross members 34 and 36 that extend across the width of the platform frame. The belt drive mechanism 32 extends and retracts the platform frame 24 by moving the platform frame along a primary belt 38 that extends between an outer cross member 40 and an inner cross member 42 of the stationary frame 22 as best illustrated in FIGS. 2 and 3 and as described in more detail below.

The wheelchair platform 26 is raised and lowered through the use of the outer and inner arms 28 and 30. The arms 28 and 30 are attached at one end to the wheelchair platform 26 and at the other end to two platform frame arms 44 that form the opposing sides of the platform frame 24. The outer and inner arms 28 and 30 are rotated around pivots on the platform frame arms 44 through the use of opposing pairs of parallel drive links 46. Each drive link 46 (FIG. 4) is rotatably attached to an elongated end of the inner arms 28 and 30 (as best seen in FIG. 4) as described in more detail below. As the drive links 46 are moved outward or inward with respect to the platform frame arms 44, they cause the outer and inner arms 28 and 30 to rotate with respect to the platform frame arms. Each drive link 46 and thus outer and inner arm 28 and 30 is driven by hydraulic actuator 48. Each hydraulic actuator 48 is attached at the actuator end to the inner end of the platform frame arms 44 and at the rod end to the inner end of the drive links 46 as best illustrated in FIG. 2 and as described in more detail below.

The wheelchair platform 26 includes a foldable outer wheelchair barrier 50, a wheelchair platform extension and foldable inner wheelchair barrier 52, and two opposing foldable side barriers 54 as shown in FIG. 4. The outer, inner, and side barriers 50, 52 and 54 help to ensure that a wheelchair and wheelchair occupant remain on the wheelchair platform 26 during operation of the wheelchair lift 20. The detailed structure and operation of the wheelchair platform and the foldable barriers will be described in more detail below.

The rectangular stationary frame 22 includes two opposing frame side members 56 (FIG. 2) that are separated by and joined together by the outer cross member 40, a middle cross member 58, and the inner cross member 42. The three cross members 40, 58, and 42 are located above the frame side members 56 and are joined to the frame side members at each end by angle pieces 60 that are welded or otherwise fastened to the frame side members 56 and the cross members 40, 58, and 42. The pieces 60 and cross members 40, 58, and 42 also serve as mounting brackets to attach the stationary frame 22 to the underside of a vehicle or other structure by bolting, welding, or other suitable fastening method.

Each frame side member 56 includes upper and lower inwardly extending elongated rails 62 and 64 as indicated in FIGS. 2 and 3. The platform frame 24 is slidably mounted within the stationary frame 22 through the use of a series of slide bearings 65 mounted along the length of the platform frame arms 44. Each slide bearing 65 extends outward from the outer surface of the respective platform frame arm 44 into a slot formed by the upper and lower rails 62 and 64. It is advantageous to form the upper and lower rails 62 and 64 of wear resistant stainless steel or other material which does not corrode or pit and the slide bearings 65 out of a low friction material such as nylon, teflon, or another suitable low friction bearing material.

The platform frame 24 is formed of the opposing side platform frame arms 44 that are joined together by the outer cross member 34 (FIG. 3) and the inner cross member 36. The inner cross member 36 is located approximately adjacent to the inner end of the platform frame arms 44 while the outer cross member 34 extends between a midpoint of the platform frame arms. The cross members 34 and 36 are attached to the platform arms 44 by welding, bolting, or other suitable fastening method. As described briefly above, the platform frame 24 is moved between its extended and retracted positions as shown in FIGS. 2 and 3 by the belt drive mechanism 32.

The belt drive mechanism 32 includes two opposing parallel support plates 66 that are spaced apart and joined at opposite ends to the outer cross member 34 and inner cross member 36 by welding, bolting, or other suitable fastening method. A drive motor 68 is mounted on one of the plates 66 such that the shaft of the drive motor extends through one of the plates 66.

A drive reduction belt 76 extends around a drive pulley (not shown) on the shaft of the drive motor 68 and around a larger secondary pulley 78. The secondary pulley 78 is rotatably mounted on a drive axle that is connected to a smaller secondary drive pulley 80. The secondary pulley 78 serves as a reduction pulley to decrease the speed and increase the torque from the drive motor 68.

A primary belt 38 (FIGS. 2 and 3) extends over the secondary drive pulley 80 and an inner idler pulley 82 and an outer idler pulley 84 that are mounted on either side of the small secondary drive pulley 80. The inner end of the primary belt 38 is attached to the lower surface of the inner cross member 42 by a quick release clamp 86 (FIG. 3) that is bolted or otherwise releasably attached to the inner cross member 42 of the stationary frame 22. The outer end of the primary belt 38 is similarly attached to the outer cross member 40 of the stationary frame 22 by a quick release clamp 90.

As the shaft of the drive motor 68 rotates counterclockwise, the large secondary pulley 78 and small secondary drive pulley 80 rotate counterclockwise. The counterclockwise movement of the small secondary drive pulley 80 causes the. belt drive 32 and thus platform frame 24 to move outward along the length of the primary belt 38, thus extending the platform frame. Similarly, as the shaft of the drive motor 68 is rotated clockwise the platform frame 24 moves inward along the length of the primary belt 38, thus retracting the platform frame. The movement of the drive motor 68 and thus platform frame 24 is controlled by a control system (not shown) that is connected to the drive motor 68.

As discussed briefly above, the wheelchair platform 26 is attached to the platform frame arms 44 by outer arms 28 and inner arms 30 that form a parallelogram linkage between the platform frame arms and the wheelchair platform. The parallelogram linkage keeps the platform frame arms 44 and wheelchair platform 26 parallel throughout the movement of the wheelchair platform from a lowered position to a raised position and vice versa. The ends of the arms 28 and 30 attached to the platform frame arms 44 are elongated (FIGS. 3 and 4) and include laterally spaced apart pivots that are attached to the platform frame arms 44 and the drive links 46. As best seen in FIG. 4, the lower portion of the elongated portion of the arms 28 and 30 is pivotally attached to the platform frame arms 44 at pivots 100 and 102, respectively. The upper portion of the elongate portion of each arm 28 and 30 is attached to a drive link 46 at pivots 104 and 106, respectively. As the drive links 46 are moved outward or inward with respect to the platform arms 44 as best seen in FIG. 4, the outer and inner arms 28 and 30 pivot about pivots 100 and 102, respectively, thus lowering or raising the platform 26.

The inner end of each drive link 46 is attached to the rod of one of the hydraulic actuators 48 at a pivot 108 as best seen in FIGS. 2 and 3. The inner arms 30 are also joined together at the pivot points 102 by a torque tube 110 that is welded or otherwise fastened to the inner surfaces of the inner arms 30. The torque tube 110 ensures that the inner arms 30 move in unison and thus maintain the same orientation with respect to each other. The torque tube 110 allows the two hydraulic actuators 48 to work together and also ensures that if there is a malfunction in the wheelchair lift the wheelchair platform 26 is maintained at the same elevation on both sides and does not cant or lean, possibly causing harm to the wheelchair occupant.

The drive links 46 are moved outward or inward with respect to the platform frame arms 44 by the extension or retraction of the rods of the hydraulic actuators 48. The hydraulic actuators 48 are attached to the drive links 46 at pivots 108 at one end and are pivotally attached to the platform frame arms 44 at pivot points 112 at the other end as best seen in FIG. 3.

In order to assist the platform 26 in clearing the stairs 124 (FIGS. 1, 2 and 4) of the bus or similar vehicle on which the wheelchair lift 20 is mounted, the ends 120 and 122 of the arms 28 and 30, respectively, are bent upward or inward as shown in FIG. 4. Configuring the wheelchair lift as shown with arms 28 and 30 having elongated portions attached at the upper end to a drive link 46 and at the lower end to a platform frame arm 44 and inwardly bent ends 120 and 122 helps the wheelchair platform 26 to clear the stairs 124 (FIG. 4) without requiring an excessive extension of the platform frame 24 out from underneath the stairs 124.

As best seen in FIG. 4, outer and inner wheelchair barriers 50 and 52 are rotatably attached to the front edge of the wheelchair platform 26 and the rear edge of the wheelchair platform respectively. The rear edge of the outer barrier 50 is rotatably attached to the front edge of the wheelchair platform 26 over its length by hinge 146 (FIG. 3). The outer barrier rotates about the hinge 146 such that it is movable from a fully folded position as illustrated in FIG. 2, to a fully extended position as illustrated in phantom in FIG. 4. The inner barrier 52 (FIG. 4) is rotatably mounted to the inner edge of the platform 26 using a hinge 184. The inner barrier 52 is movable between a fully retracted position in which the upper surface of the inner barrier 52 lies adjacent to the upper surface of the wheelchair platform 26, as illustrated in phantom in position 256, to an upright position illustrated in phantom in position 188, to a fully extended position 186 in which the upper surface of the inner barrier 52 forms an extension of the upper surface of the wheelchair platform 26 as shown in FIG. 4.

Figure 5A:
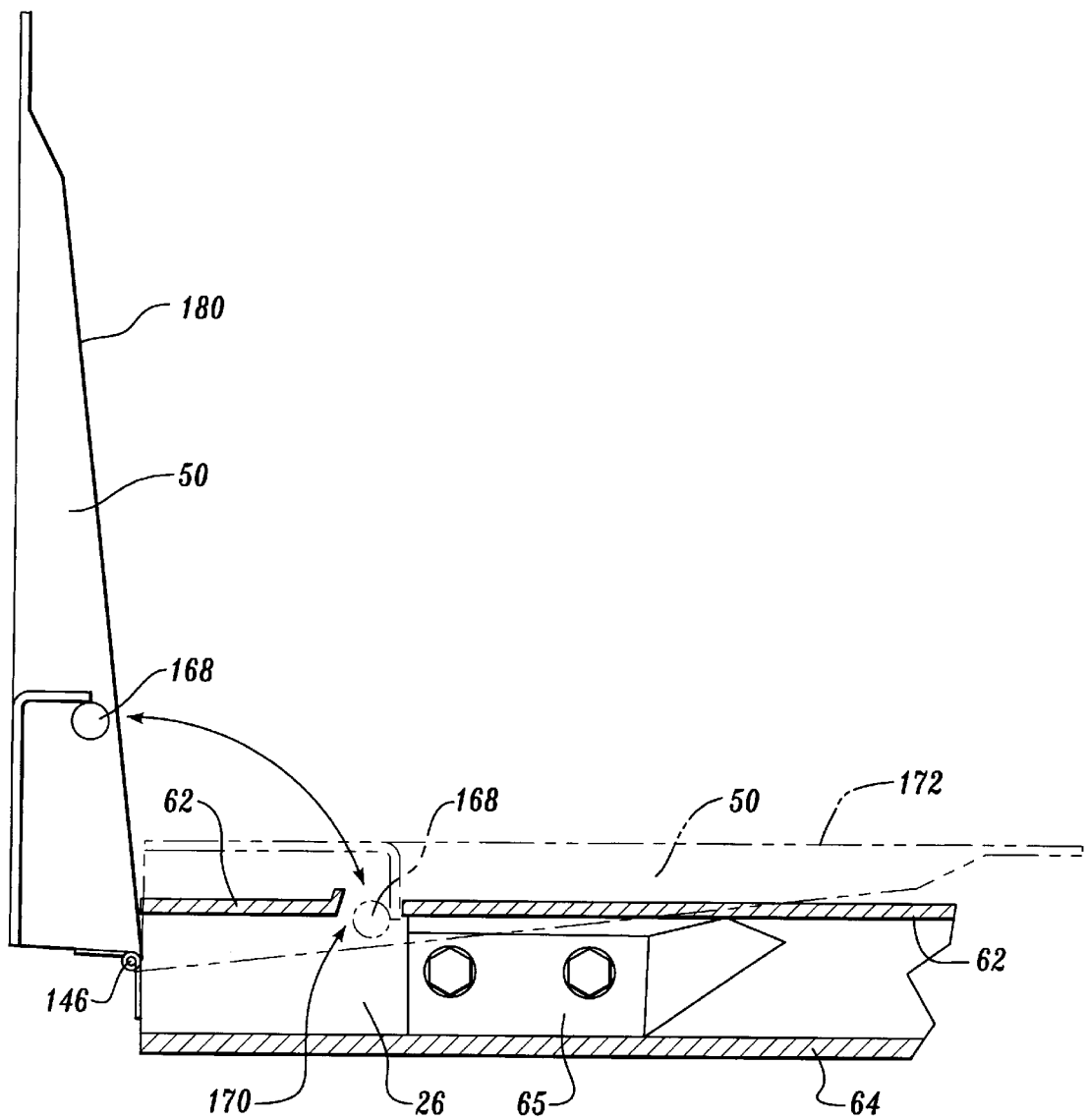
FIG. 5A is a side view of the outer wheelchair barrier of the wheelchair lift of FIG. 2.
Figure 5B:
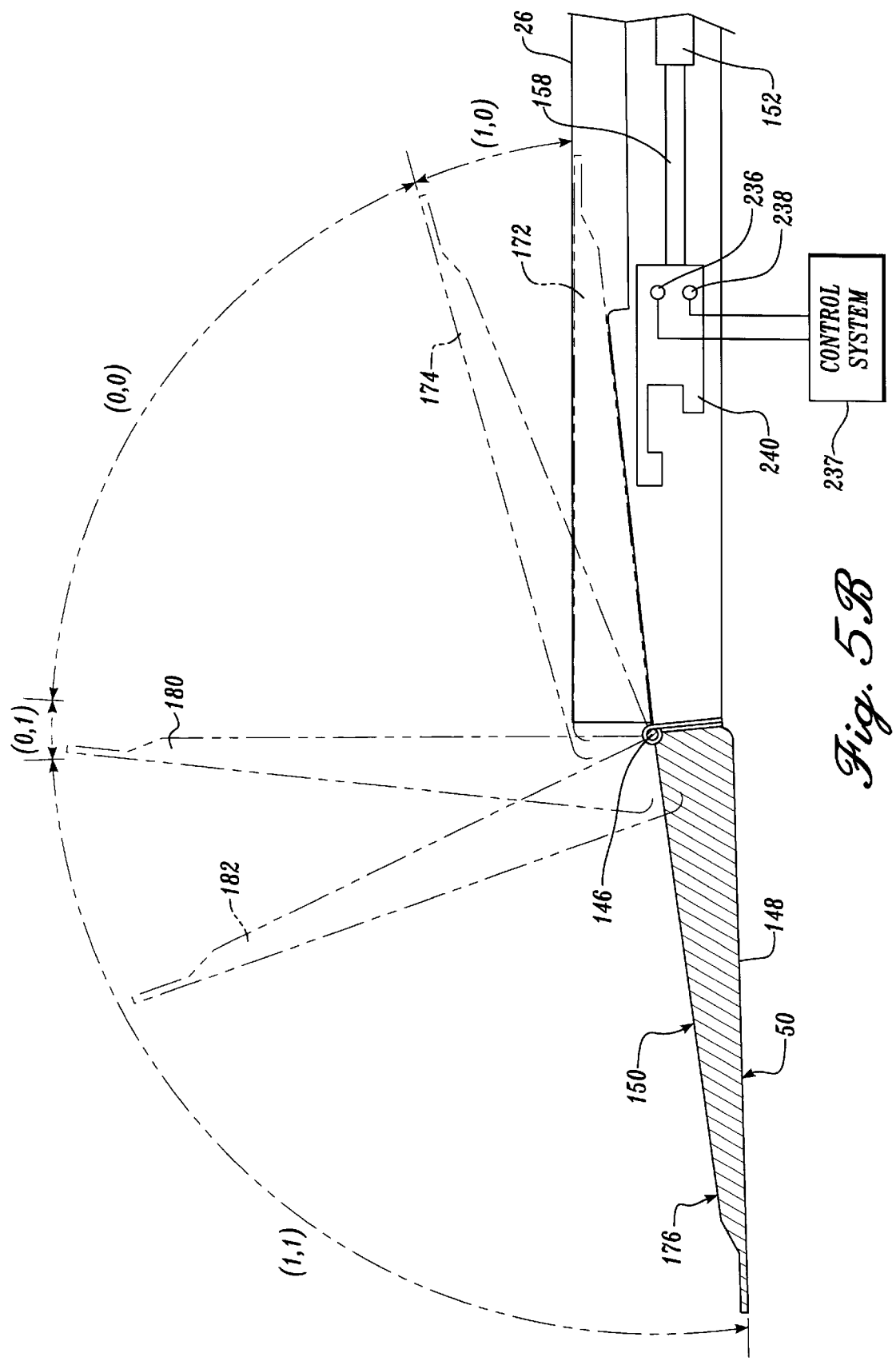
FIG. 5B is a schematic representation of the outer wheelchair barrier of the wheelchair lift of FIG. 2 showing the various operational positions of the barrier.

The structure and operation of the outer, inner, and side wheelchair barriers 50, 52, and 54, respectively, will now be described by reference to FIGS. 5–8. The rear edge of the outer barrier 50 is rotatably attached to the front edge of the wheelchair platform 26 over its width by a hinge 146 as seen in FIG. 5A. As illustrated in FIG. 5B, the outer barrier 50 rotates around the hinge 146 such that the barrier is movable from a fully retracted position 172 in which it is in an overlapping relationship with the wheelchair platform 26, to a fully extended position 176 in which barrier 50 extends in approximately the same plane as the wheelchair platform.

As shown in FIG. 5B, in the fully retracted position 172, the lower surface 148 of the outer barrier 50 faces upward and forms the bottom stair step 124 of the vehicle in which the wheelchair lift 20 is mounted (see phantom steps in FIG. 2), while the upper surface 150 of the outer barrier lies adjacent the upper surface of the platform 26. In its fully extended position 176, the outer barrier 50 extends outward from the end of the wheelchair platform 26. The upper surface 150 of the outer barrier 50 slants upward to form a triangular shape such that in its extended position 176 the outer barrier forms a ramp that helps a wheelchair occupant to move a wheelchair up the ramp and onto the wheelchair platform 26.

Figure 7:
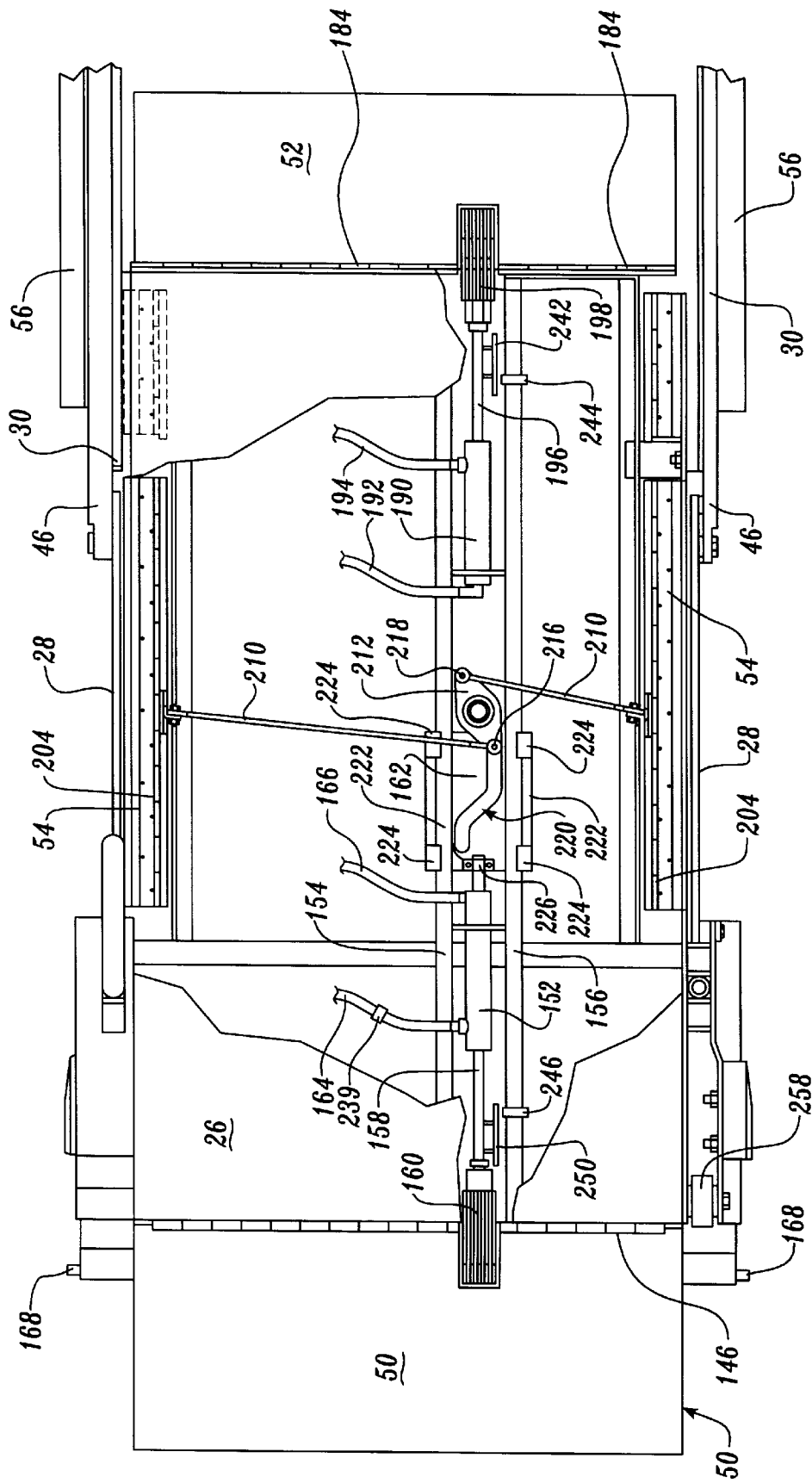
FIG. 7 is a top partial cutaway view of the wheelchair platform illustrating the drive mechanism for the outer, inner, and side wheelchair barriers.

As shown in FIG. 7, the barrier 50 is moved between its extended and retracted positions by a hydraulic cylinder 152 that is mounted on opposing spacedapart support frames 154 and 156 that run the length of the wheelchair platform 26. The hydraulic cylinder 152 includes a rod 158 that is mounted to a hinge mechanism 160 at one end and to a slidable cam plate 162 at the opposite end as described in more detail below. The hinge mechanism 160 could be any suitable hinge mechanism capable of moving the outer barrier 50 through approximately 180° of movement so that the outer barrier may be moved from between its extended and retracted positions. One suitable hinge mechanism is described in U.S. Pat. No. 5,284,418 to Kempf, the disclosure of which is hereby specifically incorporated by reference. The hydraulic cylinder 152 is connected to a hydraulic control system (not shown) through hydraulic lines 164 and 166.

The outer wheelchair barrier 50 serves a number of functions in addition to providing a ramp for a wheelchair. As shown in FIGS. 5A and 7, the barrier 50 includes stow latch pin 168. When the barrier 50 is in its fully folded and retracted position, as shown in phantom in position 172 in FIG. 5A, the pin 168 engages the upper rail 62 and prevents the barrier 50 from moving longitudinally with respect to the upper rail 62. The barrier 50 is attached to the platform frame 24, and the upper rail 62 is part of the stationary frame 22. Thus, by locking the pin 168 into the upper rail 62, the pin 168 prevents the platform frame 24 from moving in or out with respect to the stationary frame 22 such that the platform frame 24 is prevented from moving to its extended position.

The stow latch pin 168 extends outward from the inner end of both sides of the wheelchair barrier 50 (FIG. 7). In operation, in the retraction sequence of the wheelchair lift, which is described in more detail below, the platform frame 24 retracts fully within the stationary frame 22, as best seen in FIG. 2. The outer barrier 50 then moves to a fully stowed or retracted position in which the latch pins 168 move into gaps 170 (FIG. 5A) in the upper rails 62 in order to prevent the platform frame from moving outward within the stationary frame 22. As the platform frame 24 attempts to move outward, the latch pins 168 contact the upper rails 62 and thus prevent further forward movement of the platform frame.

In addition to serving as a ramp and a stow latch, the outer barrier 50 also serves as a wheelchair barrier to prevent a wheelchair located on the wheelchair platform 26 from moving off the outer edge of the wheelchair platform. The various positions of the outer barrier 50 are best illustrated in FIG. 5B. From the fully retracted position 172, the barrier 50 can move upward, pivoting on hinge 146 to an unlatched position 174. When the barrier 50 is in the unlatched position 174, the platform frame 24 can be moved between its extended and retracted positions, as described above. Once the platform frame 24 is in its extended position, the outer barrier 50 moves from the unlatched position 174 to the approximately upright position 180. When the platform 26 is lowered to the ground, the barrier 50 moves from the upright position 180 to the fully extended position 176 in which the outer barrier serves as a ramp between the ground and the platform. Once a wheelchair is located on the platform 26, the outer barrier 50 moves back to the upright position 180 in which it acts to prevent a wheelchair from moving off of the front of the wheelchair platform 26.

The outer barrier in its upright position 180 also acts as an energy-absorption, energy-dissipation safety barrier to absorb or dissipate some of the energy of an impact with a wheelchair located on the wheelchair platform 26. In order to absorb and dissipate the energy of collision, the control system 237 that controls the hydraulic cylinder 152 includes a pressure relief valve 239 that is set at a predetermined pressure. When a wheelchair rolls into the outer barrier 50, the outer barrier moves from the fully upright position 180 to a partially lowered position 182 as the hydraulic fluid pressure in the hydraulic cylinder 152 is relieved by the pressure relief valve 239. The movement of the outer barrier 50 between the upright position 180 and partially lowered position 182 allows the outer barrier to absorb and dissipate part of the energy of collision between a wheelchair and the outer barrier, thus helping to reduce any injury to the wheelchair occupant or damage to the wheelchair or lift.

The control system 237 detects the various positions of the outer barrier 50 through the use of two proximity sensors 236 and 238 and a proximity plate 240 (FIGS. 5B and 7). The proximity sensors 236 and 238 are mounted on the support frame 156 while the proximity plate 240 is mounted on the rod 158 such that it moves outward and inward along with the rod. The proximity sensors 236 and 238 are used to provide a digital indication of the various positions of the outer barrier 50. Each sensor 236 and 238 provides a "0" or "1" signal depending on whether part of the proximity plate 240 which is formed from a target material is located in front of the sensor. A "1" signal is given from a sensor which has the target material in front of it. The information from the sensors is thus digital in nature.

As shown in FIG. 5B, when the outer barrier 50 is in its fully extended position 176, the target plate 240, which moves with the rod 158, is in front of both of the stationary sensors 236 and 238 and thus provides the control system with a (1,1) position signal indication. The (1,1) signal is comprised of the signal from the sensor 236 as the first digit, and the signal from the sensor 238 as the second digit. The signals corresponding to each range of positions are shown schematically above the various positions of the outer barrier 50 in FIG. 5B. When the outer barrier 50 reaches the fully upright position 180, the proximity plate 240 has moved inward to a point where a cut-out section of the plate 240 is in front of sensor 236 and a lower extended part of the plate 240 is in front of the sensor 238, thus providing the control system 237 with a position indication of (0,1). As the outer barrier 50 moves slightly past the upright position 180 towards the retracted position 174, the cut-out section of the proximity plate 240 is in front of both of the sensors 236 and 238, which thus provide the control system with a position indication of (0,0). When the rod 158 has moved inward to the point that the outer barrier 50 is in the unlatched position 174, an upper extended portion of the proximity plate 240 is in front of the sensor 236, and the cut-out section is in front of the sensor 238, thus providing a position indication of (1,0). The position indication of (1,0) is provided to the control system throughout the outer barrier's movement from the unlatched position 174 to the stowed and latched position 172.

Failure of the sensors 236 and 238 can cause the control system to receive erroneous signals as to the outer barrier's position. For example, if the sensor 236 were to fail low, it would output a constant "0" signal regardless of the position of the plate 240. The outer barrier 50 is designed to make the lift safer with regard to the motion of the outer barrier 50 should sensor failure occur. Safety during the period when the barrier 50 is moving from the extended position 176 to the upright position 180 is important because a passenger may be on the lift. The dangers during outer barrier movement are that due to sensor failure the barrier 50 will fail to move far enough upwards towards the upright position 180 to properly protect the passenger, or that the barrier 50 will move past the upright position 180 and trap or crush a person or object between the barrier 50 and the wheelchair platform 26. Such dangers are avoided using the sensors 236 and 238.

The following example helps illustrate how the sensors 236 and 238 are used to increase barrier safety. Once a passenger has boarded the platform 26, the lift is designed to move the outer barrier 50 from the extended position 176 (FIG. 5B) to a position just past the upright position 180 and then immediately back to the upright position again. Thus, using the above binary designations, the control system begins rotating the barrier clockwise from the ramp (1,1) position and continues rotating it until it receives a (0,0) sensor signal, which will occur immediately after the normal upright (0,1) position. The control system then rotates the barrier 50 counterclockwise back toward the extended position 176 until it receives a (0,1) sensor signal which occurs almost immediately.

When a sensor failure occurs, it outputs a constant '0' reading regardless of whether or not the sensor plate 240 is in front of the sensor. There are three possible sensor failures which can occur and hinder the normal operation of the barrier 50. First, the sensor 236 can fail by itself; second, the sensor 238 can fail by itself; and third, both sensors can fail at the same time.

If only one of the two sensors 236 or 238 fails while the barrier 50 is moving clockwise from the extended position 176 to the upright position 180, the control system will receive either a (0,1) signal or a (1,0) signal, (depending on which sensor failed). The control system waits for a (0,0) signal before it stops moving the barrier 50 during this sequence, so it continues to move the barrier 50 even when this type of sensor failure occurs. Thus, the danger of the control system prematurely stopping the barrier 50 from reaching the upright position 180, and incorrectly interpreting that it had in fact reached the upright position is avoided.

If under these circumstances the sensor 238 failed, then when the control system moves the barrier 50 to the upright position 180, the usual (0,1) signal will instead register as a (0,0). As a result, the control system will incorrectly interpret that it has reached a position just past the upright position 180 and will stop the barrier 50. Once the (0,0) signal is received, the control system moves the barrier 50 counterclockwise, looking for a (0,1) signal. In this case, sensor 238 has failed, so a (0,1) signal will not occur and the barrier 50 will continue to move all the way back to the extended position 176. The control system, having not ever received the proper (0,1) signal, will not allow the platform to be raised.

If instead the sensor 236 fails, the control system will still receive the correct (0,1) signal at the upright position 180, and will move the barrier 50 to the position just past the upright position 180, where the control system receives a (0,0) signal and stops the barrier 50. The control system then moves the barrier 50 counterclockwise until it receives a (0,1) signal, stopping the barrier in the upright position 180.

In the event that both sensors 236 and 238 fail during movement of the barrier from extended position 176 to upright position 180, the control system will stop barrier 50 at whatever point the double failure occurs, since it will receive a (0,0) signal. The control system then moves the barrier 50 back the other way searching for the (0,1) sensor signal, which will not occur. Thus, the barrier 50 will move counterclockwise back to the extended position 176. The control system, having not ever received the proper (0,1) signal, will not allow the platform to be raised. Thus, in all three possible cases of sensor failure, the control system prevents the barrier 50 from trapping or crushing a person or object located on the platform.

As mentioned above, the wheelchair platform 26 also includes a movable inner barrier 52, as illustrated in FIG. 7. The outer edge of the inner barrier 52 is rotatably mounted to the inner edge of the platform 26 using a hinge 184. As was illustrated in FIG. 4, the inner barrier 52 is movable from a fully retracted position 256, to an upright position 188, to a fully extended position 186. In its fully upright position 188, the inner barrier 52 prevents a wheelchair from moving off the inner edge of the wheelchair platform 26. In its fully extended position 186, the inner barrier 52 forms a bridge between the wheelchair platform 26 and the stairs 124 of the bus on which the lift 20 is mounted so that a wheelchair may exit the wheelchair lift and enter the interior of the bus 124b or other vehicle.

As shown in FIG. 7, the inner barrier 52 is actuated using a hydraulic cylinder 190 that is connected to a control mechanism (not shown) by hydraulic lines 192 and 194. The rod 196 of the hydraulic cylinder 190 is connected to a hinge mechanism 198 that actuates the inner barrier 52. The hinge mechanism may be similar to the hinge mechanism 160 used to actuate the outer barrier 50. In a manner similar to that used on the outer barrier 50, it may be advantageous for the control system to include a pressure relief valve that allows the inner barrier 52 to absorb part of the energy of a collision between a wheelchair and the inner barrier 52.

In a manner similar to that described with respect to the outer barrier 50, the inner barrier 52 includes a positional indication system consisting of two proximity sensors 244 (one sensor is shown in FIG. 7, the other sensor is mounted directly beneath the sensor shown) mounted on the support frame 156, and a proximity plate 242 mounted on a rod 196 such that the plate 242 moves outward and inward along with the rod 196. The two proximity sensors 244 and proximity plate 242 function in a manner similar to the proximity sensors 236 and 238 and proximity plate 240 described above with respect to the outer barrier 50 and are used to provide a digital indication of the various positions of the inner barrier 52. Each sensor 244 provides a "0" or "1" signal depending on whether part of the proximity plate 242 which is formed from a target material is located in front of the sensor. A "1" signal is given from a sensor which has the target material in front of it. The information from the sensors is thus digital in nature.

The platform 26 also includes opposing foldable side barriers 54 that are best illustrated in FIGS. 4 and 6. The foldable side barriers 54 are movable between an overlapping retracted position 272 in which they lie adjacent the upper surface of the wheelchair platform 26, as shown in phantom in FIG. 6, and a deployed position 280 in which they extend upward approximately perpendicular to the upper surface of the platform 26. The side barriers 54 are actuated between the extended and retracted positions by the same hydraulic cylinder 152 used to actuate the outer barrier 50.

Figure 8:
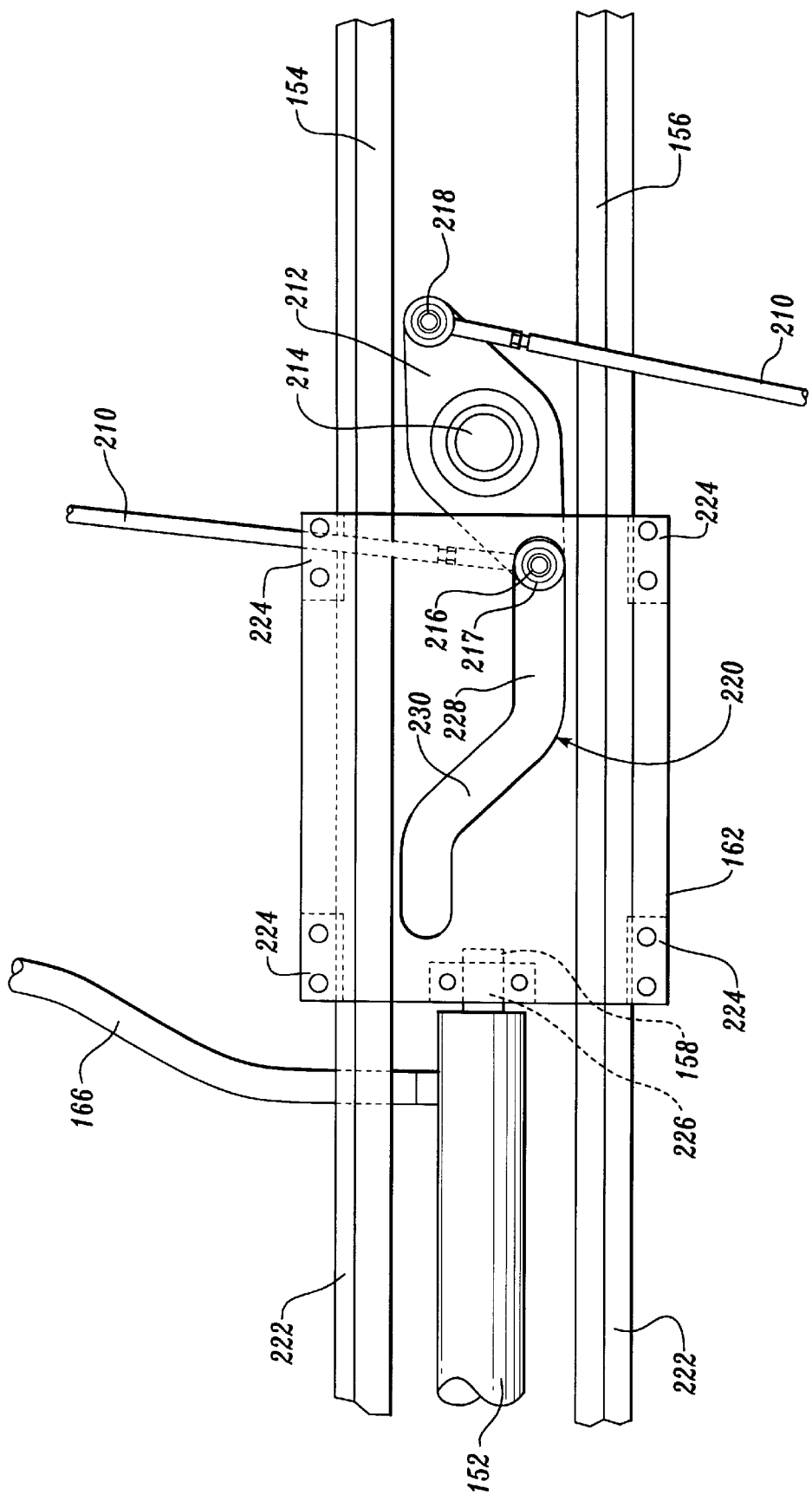
FIG. 8 is an enlarged cutaway view of the drive mechanism for the side wheelchair barriers.

The bottom ends 200 of the side barriers 54 are curved through 180° and are rotatably mounted to the bottom 26b of the wheelchair platform 26 by hinges 204 that extend along the length of the barriers 54. The inward-facing edge 206 of each bottom portion 200 includes a bracket 208 that extends outward from the edge 206 and is rotatably mounted to a push rod 210. Each push rod 210 extends inward from the respective bracket 208 and is rotatably connected to one end of a bell crank 212 (FIGS. 6, 7 and 8). The bell crank 212 is rotatably mounted on a shaft 214 that is rigidly attached to the bottom of the wheelchair platform 26. As can best be seen in FIGS. 7 and 8, the push rods 210 are rotatably attached to the bell crank 212 at pivots 216 and 218, respectively. As can best be seen in FIG. 8, the bell crank 212 includes a cam follower 217 that extends downwardly from the pivot point 216 through a slot 220 in the cam plate 162.

The cam plate 162 is slidably mounted on the support frame members 154 and 156. Each frame member 154 and 156 includes an outward extending rail 222 that extends the length of the frame members. The cam plate is slidably attached to the rails 222 using four slide bearings 224 located at the four corners of the cam plate 162. Each slide bearing 224 includes a slot that receives the respective rail 222 to allow the cam plate to slide along the rails. As best seen in FIG. 8, the cam plate 162 is also connected to the rear end of the hydraulic rod 158 by a bracket 226.

As the cam plate 162 moves outward or inward, the cam follower 217 on the bell crank 212 slides within a slot 220 in the cam plate. The slot 220 is Z-shaped such that as the cam plate 162 moves outward or inward it causes the bell crank 212 to pivot on the shaft 214. As illustrated in FIGS. 6, 7 and 8, when the outer barrier 50 is fully extended, the cam follower 217 is located at the inner edge of the slot 220, and the push rods 210 are fully retracted. When the push rods 210 are retracted, the side barriers 54 are pulled into their upright positions 280 (FIG. 6) in which they extend approximately perpendicular to the upper surface of the wheelchair platform 26.

As can best be seen in FIG. 8, the inner end 228 of the slot 220 is approximately straight for a predetermined distance such that as the cylinder rod 158 retracts causing the outer barrier 50 to move to an upright position 180, the bell crank 212 remains in a retracted position in which the side barriers 54 remain in an upright position 280. As the outer barrier 50 is further retracted, the cylinder rod 158 continues to move inward such that the cam follower 217 moves within the slanted portion 230 of the slot 220, thus causing the bell crank 212 to rotate. As the bell crank 212 rotates, the push rods 210 move outward causing the barriers 54 to pivot on hinges 204 and to move to an overlapping retracted position 272, as shown in phantom in FIG. 6.

Figure 9A:
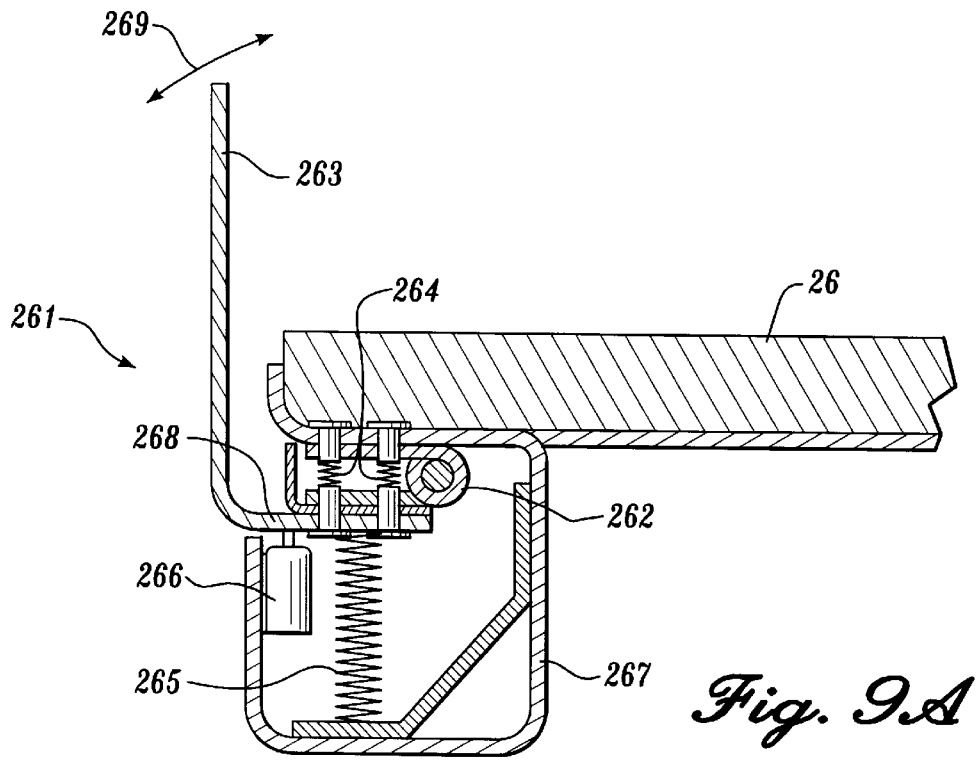
FIG. 9A is a cross-sectional view of a sensitive barrier for use on the wheelchair platform.
Figure 9B:
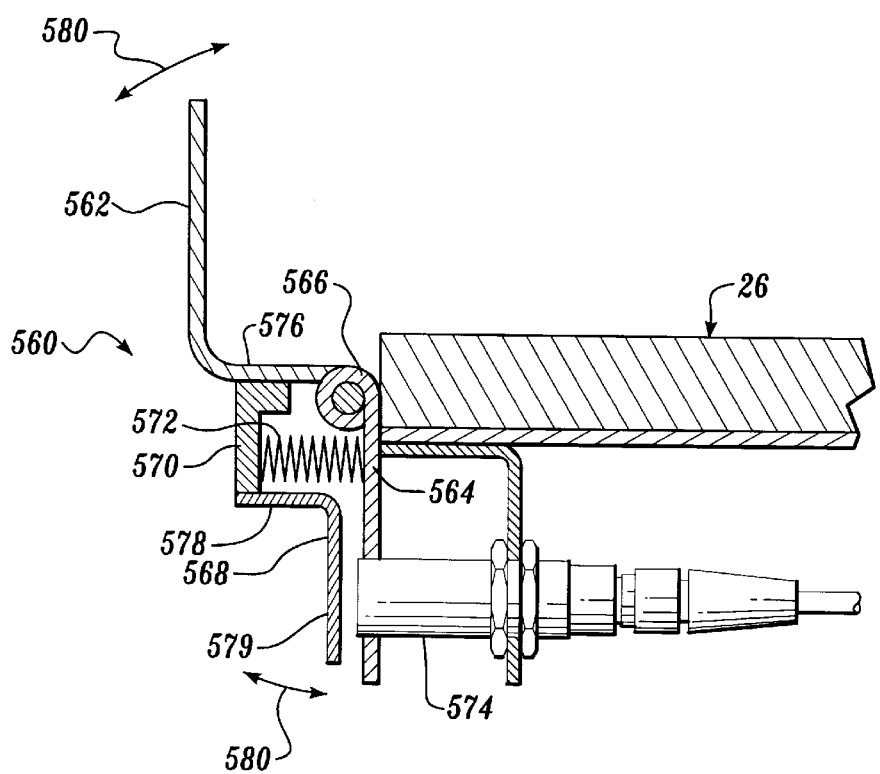
FIG. 9B is a cross-sectional view of another sensitive side barrier for use on the wheelchair platform.

In alternate embodiments, the foldable side barriers 54 may be removed or may be supplemented by a sensitive side barrier. Two different embodiments of a sensitive side barrier are illustrated in FIGS. 9A and 9B. In the first embodiment (FIG. 9A) the sensitive barrier 261 extends upward from the upper surface of the wheelchair platform 26 along at least a portion of the opposite edges of the wheelchair platform. The sensitive barrier 261 may extend either over a portion of the length of the platform 26 or it may extend over the entire length of the platform 26. In the preferred embodiment shown in FIG. 9A, it is preferable that the sensitive barrier 261 extends over the majority of the length of the platform.

The sensitive barrier 261 is L-shaped, having one leg 263 that extends upward approximately normal to the upper surface of the platform 26 and another leg 268 of the "L" extending inward underneath the surface of the deck 26. The sensitive barrier 261 is rotatably mounted to the bottom surface of the wheelchair platform 26 by a hinge 262. The sensitive barrier 261 is biased into an upright position in which the leg 263 extends approximately perpendicular to the upper surface of the wheelchair platform 26 by one or more tension springs 264 and a compression spring 265. The tension springs 264 extend between the top surface of leg 268 and the bottom surface of the wheelchair platform 26 in order to bias the sensitive barrier 261 to its upright, non-triggered position. The compression spring 265 extends between the lower surface of the sensitive barrier 261 and a bracket 267 that extends downward from the surface of the platform 26 under the leg 268 of the sensitive barrier 261. The compression spring 265 also helps to bias the sensitive barrier into its upright position as shown in FIG. 9A.

A pressure sensitive sensor 266 is mounted below the bottom surface of the leg 268 of the sensitive barrier 261. When a wheel or other portion of a wheelchair contacts the sensitive barrier 261, the sensitive barrier pivots counter-clockwise as shown by arrow 269. As the sensitive barrier pivots counterclockwise, the outer edge of the leg 268 moves downward displacing the pressure sensitive sensor 266. When the sensor 266 is triggered, it sends a signal to the wheelchair lift control system (not shown) instructing the system to stop the motion of the wheelchair lift or as an additional option to provide the operator a warning signal, depending on the application. The sensitive barrier 261 thus warns an operator and prevents operation of the wheelchair lift when a wheelchair is incorrectly positioned on the platform 26. Once the wheel of the wheelchair or the person moves out of contact with the sensitive barrier 261, it pivots clockwise as shown by arrow 269, thus allowing the sensor 266 to return to its normal, untriggered state.

A second embodiment of a sensitive side barrier 560 is illustrated in FIG. 9B. As with the first embodiment described above, the sensitive side barriers 560 also detect if a passenger is positioned too closely to the sides of the platform 26. As with the first embodiment, the sensitive side barriers 560 extend upward from the upper surface of the wheelchair platform 26 along all or a portion of the opposite edges of the wheelchair platform. As shown in FIG. 9B, each sensitive side barrier 560 includes a barrier leaf 562, a fixed leaf 564, a stop 568 and a stop block 570. The fixed leaf 564 is mounted to the side of the platform 26. The barrier leaf 562 is L-shaped, having the inner edge of the lower leg 576 rotatably attached to the upper edge of the fixed leaf 564, using a hinge 566. The top surface of the stop block 570 is mounted to the lower surface of the lower leg 576. The stop 568 is also L-shaped and the upper surface of the upper leg 578 is mounted to the lower surface of the stop block 570. The lower leg 579 extends downward from the inner edge of the upper leg 578 approximately parallel to the fixed leaf 564 when the sensitive barrier 560 is in an untriggered position, as illustrated in FIG. 9B. The sensitive barrier 560 is biased into an upright position in which the barrier leaf 562 extends approximately perpendicular to the upper surface of the wheelchair platform 26 by return spring 572. The return spring 572 extends between the inner edge of the stop block 570 and the outer edge of the fixed leaf 564 in order to bias the sensitive barrier 560 to its upright nontriggered position.

A sensor 574 is mounted to the bottom end of the fixed leaf 564, under the platform 26, and facing the lower leg 579 of the stop 568. As shown in FIG. 9B, when the side barrier 560 is in its normal, undeformed state, the lower leg 579 of the stop 568 is approximately parallel to the fixed leaf 564. When a wheel or other portion of a wheelchair contacts the barrier leaf 562, the barrier leaf 562 pivots counterclockwise on the hinge 566 as shown by arrows 580. As the barrier leaf 562 pivots counterclockwise, the stop block 570 and stop 568 also pivot counterclockwise against the biasing force of the return springs 572. As the bottom portion of the lower leg 579 moves closer to sensor 574, sensor 574 sends a signal to the wheelchair lift control system (not shown) instructing the system to stop the motion of the wheelchair lift, or as an additional option to provide the operator with a warning signal, depending on the application. The sensitive barriers 560 thus warn an operator or prevent operation of the wheelchair lift when a wheelchair is incorrectly positioned on the platform 26. Once the wheel of the wheelchair or the person moves out of contact with the sensitive barrier 560, it pivots clockwise as shown by arrows 580, thus allowing the sensitive barrier 560 to return to its normal, untriggered state.

The L-shaped configuration of the barrier leaf 562 allows the sensitive barrier 560 to more easily detect both horizontal and vertical forces applied to the sensitive side barrier 560. The L-shaped configuration of the barrier leaf 562 also allows the width of the platform 26 to be maximized while still allowing the side barriers to respond to contact with a wheelchair or person on the platform 26.

In addition to the side barriers, in some embodiments of the invention, it may also be advantageous to place a pressure sensitive mat over the upper surface of the platform 26. The pressure sensitive mat provides the wheelchair control system a control signal indicating whether or not a wheelchair, person, or other obstruction is located on top of the wheelchair platform 26. In some applications, the sensitive mat could provide a signal indicating the location of the wheelchair, individual, or other obstruction on the wheelchair platform 26. The information provided by the sensitive mat is used as a safety system to prevent operation of the wheelchair lift when a person or wheelchair is in an inappropriate position on the wheelchair platform at an inappropriate time. For example, if the sensitive mat detected a person or wheelchair on the upper surface of the wheelchair platform 26, the sensitive mat would provide a control signal to the control system to prevent the outer, side, or inner barriers 50, 54, or 52 from moving to their retracted positions in which they lie adjacent the upper surface of the wheelchair platform 26. Thus, the sensitive mat could prevent a wheelchair occupant or other person from being trapped between the outer, side or inner barriers 50, 54 or 52 and the upper surface of the wheelchair platform 26.

In addition to the foldable barriers 50, 52 and 54, the wheelchair platform 26 also includes opposing hand rails 250 (FIG. 2) that extend upward from the opposing edges of the wheelchair platform. The hand rails 250 may be placed within one of multiple recesses 252 located on the side of the wheelchair platform 26. The multiple recesses 252 allow the position of the hand rails 250 to be adjusted. This adjustment allows the wheelchair lift 20 to be used in different vehicles while still allowing the hand rails 250 to be positioned so that they do not interfere with the steps or doors of the vehicle. The hand rails 250 are secured within the recesses 252 by pins that extend through the hand rails 252 and holes 260 (FIG. 4) in the walls of the recesses. The hand rails 250 could also be secured within the recesses by other suitable fastening methods.

The general operation of the wheelchair lift 20 will now be described. During standard operation of the bus or other vehicle on which the wheelchair lift 20 is mounted, the wheelchair lift 20 is maintained in its stowed position (FIG. 2) underneath the bus. When the vehicle stops in order to load a wheelchair onto the vehicle, the wheelchair lift 20 moves as follows. First, the platform frame 24 is moved to its fully extended position by the belt drive mechanism 32. Once extended, the outer, inner, and side barriers 50, 52, and 54 are moved to upright positions by hydraulic actuators 152 and 190 (FIG. 7). As shown in phantom in FIG. 4, the platform 26 is then lowered into contact with the ground by arms 28 and 30 which are actuated by drive links 46 (FIG. 3) which are actuated by hydraulic actuators 48. As the outer edge of a wheelchair platform 26 nears the sidewalk, wheels 258 (FIG. 4) located at the front edge of the wheelchair platform 26 contact the ground and allow the wheelchair platform 26 to move in and out on the ground slightly as the vehicle tilts or rolls due to vehicle suspension movement during operation of the wheelchair lift. Once the wheelchair platform 26 contacts the ground, the control system (not shown) stops the downward movement of the wheelchair platform 26. The outer barrier 50 is then moved to its fully extended position 176 as illustrated in FIG. 5B.

Once the wheelchair lift is fully deployed, a wheelchair occupant moves his or her wheelchair up the ramp formed by the outer barrier 50 onto the wheelchair platform 26. After the wheelchair is on the wheelchair platform 26, the outer barrier 50 moves to its upright position 180, as shown in FIG. 5B. As shown in FIG. 4, the wheelchair platform 26 is then raised to its fully raised position by the arms 28 and 30 and drive links 46 and hydraulic actuators 48. Once the upper surface of the wheelchair platform 26 lies in the same plane as the upper surface of the stairs 124*b* (shown in phantom in FIG. 4), the inner barrier 52 moves to its fully extended position 186 such that the inner barrier 52 bridges the gap between the wheelchair platform 26 and the stairs 124*b*. The wheelchair occupant may then move the wheelchair into the interior of the bus or other vehicle over the inner barrier 52. In order for a wheelchair to be lowered from the interior of the bus to the sidewalk, the wheelchair lift operates in reverse order. After loading or unloading a wheelchair, the wheelchair platform 26, barriers 50, 52 and 54, and platform frame 24, move to their fully retracted and stowed position, as illustrated in FIG. 2.

The wheelchair lift 20 of the present invention reduces or eliminates a number of the problems associated with prior art wheelchair lifts. The use of an inner barrier 52 to form a bridge between the wheelchair lift platform 26 and the steps 124*b* of the bus allows the wheelchair lift to be used on different vehicles with only minor changes. The same design wheelchair lift 20 may be used in different vehicles by adjusting the height to which the wheelchair platform 26 is raised and the length of the inner barrier or bridge 52.

The wheelchair lift 20 also incorporates a number of features to prevent or reduce the possibility of harm to a wheelchair occupant. Such features include foldable outer 50, inner 52, and side barriers 54 to prevent a wheelchair from moving off of the wheelchair platform 26. The electronic control system that controls the wheelchair barriers is designed to prevent the barriers and lift from operating in ways and at times which could allow the barriers to fold inward onto a wheelchair or wheelchair occupant on the wheelchair platform, even if sensor failure occurs. A sensitive barrier such as barriers 261 or 560 located on the sides of the wheelchair platform 26 responds to both vertical and horizontal forces to provide an indication of whether or not the wheelchair is moving into a dangerous position. A sensitive mat located on the upper surface of the wheelchair platform 26 also provides an indication of whether or not a wheelchair or person is on the wheelchair platform.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A wheelchair lift comprising:
   (a) a platform frame movable between an extended position and a retracted position;
   (b) a wheelchair platform coupled to the platform frame, the wheelchair platform being movable between a raised position and a lowered position; and
   (c) opposing sensitive barriers movably coupled to opposing sides of the wheelchair platform, the sensitive barriers extending upward from an upper surface of the wheelchair platform such that contact between the sensitive barriers and an article on top of the wheelchair platform produces a control signal indicative of the presence of an article contacting the sensitive barrier.

2. The wheelchair lift of claim 1, further comprising a control system that controls the movement of the wheelchair lift and wherein the control system stops the movement of the wheelchair platform when the sensitive barriers produce the control signal indicative of an article contacting the sensitive barrier.

3. The wheelchair lift of claim 1, wherein an upper portion of each sensitive barrier is horizontally offset from a lower portion of the sensitive barrier.

4. The wheelchair lift of claim 1, wherein the sensitive barriers produce the control signal in response to the application of at least one of a vertical and a horizontal force being applied to the sensitive barriers.

5. The wheelchair lift of claim 1, wherein the sensitive barriers are rotatably coupled to the sides of the wheelchair platform such that rotation of one or more of the sensitive barriers produces the control signal.

6. The wheelchair lift of claim 1, wherein the sensitive barriers are biased into a nontriggered position by a spring.

7. A wheelchair lift comprising:
   (a) a platform frame movable between an extended position and a retracted position;
   (b) a wheelchair platform coupled to the platform frame, the wheelchair platform being movable between a raised position and a lowered position; and
   (c) opposing foldable side barriers attached to opposite sides of the wheelchair platform, the foldable side barriers being movable between a raised position in which the side barriers extend approximately perpendicular to an upper surface of the wheelchair platform and a retracted position in which the side barriers lie adjacent the upper surface of the wheelchair platform, wherein the bottom ends of the side barriers are curved through 180 degrees.

8. A wheelchair lift comprising:
   (a) a platform frame movable between an extended position and a retracted position;
   (b) a wheelchair platform coupled to the platform frame, the wheelchair platform being movable between a raised position and a lowered position;
   (c) opposing foldable side barriers attached to opposite sides of the wheelchair platform, the foldable side barriers being movable between a raised position in which the side barriers extend approximately perpendicular to an upper surface of the wheelchair platform and a retracted position in which the side barriers lie adjacent the upper surface of the wheelchair platform; and
   (d) a bell crank that is rotatably attached to the wheelchair platform, the opposing foldable side barriers being attached to opposing ends of the bell crank such that rotation of the bell crank moves the side barriers between the raised and retracted positions.

9. The wheelchair lift of claim 8 further comprising an actuator attached to the wheelchair platform and a plate having a Z-shaped slot attached to the actuator and the bell crank such that the movement of the plate by the actuator causes the bell crank to rotate.

10. A wheelchair lift comprising:
   (a) a platform frame movable between an extended position and a retracted position;
   (b) a wheelchair platform coupled to the platform frame, the wheelchair platform being movable between a raised position and a lowered position;
   (c) opposing foldable side barriers attached to opposite sides of the wheelchair platform, the foldable side barriers being movable between a raised position in which the side barriers extend approximately perpendicular to an upper surface of the wheelchair platform and a retracted position in which the side barriers lie adjacent the upper surface of the wheelchair platform; and
   (d) opposing hand rails releasably coupled to opposite sides of the wheelchair platform, the hand rails extending upward from an upper surface of the wheelchair platform and being movable between a plurality of different locations along the length of the wheelchair platform.

\* \* \* \* \*